Feb. 9, 1932.    E. H. GREIBACH    1,844,649

SYNCHRONOUS MOTOR

Filed Oct. 28, 1929

INVENTOR
Emil H. Greibach.
BY
Wesley G. Carr
ATTORNEY

Patented Feb. 9, 1932

1,844,649

UNITED STATES PATENT OFFICE

EMIL H. GREIBACH, OF NEW YORK, N. Y., ASSIGNOR TO WESTINGHOUSE ELECTRIC & MANUFACTURING COMPANY, A CORPORATION OF PENNSYLVANIA

SYNCHRONOUS MOTOR

Application filed October 28, 1929. Serial No. 402,875.

My invention relates to synchronous motors and it has particular relation to small units suitable for clock and meter service operating on single-phase alternating current and running at a constant synchronous speed.

The object of my invention is to provide a novel arrangement for motors of the type just designated, whereby much greater torques are produced than have heretofore been possible in devices of this character, and yet the power consumed is very small; less than 5 watts in the largest size of motor which I have yet built.

With the foregoing and other objects in view, my invention consists of the combinations and features of construction set forth in the following description and definitely pointed out in the claims, reference being had to the accompanying drawings, wherein;

Figure 1:
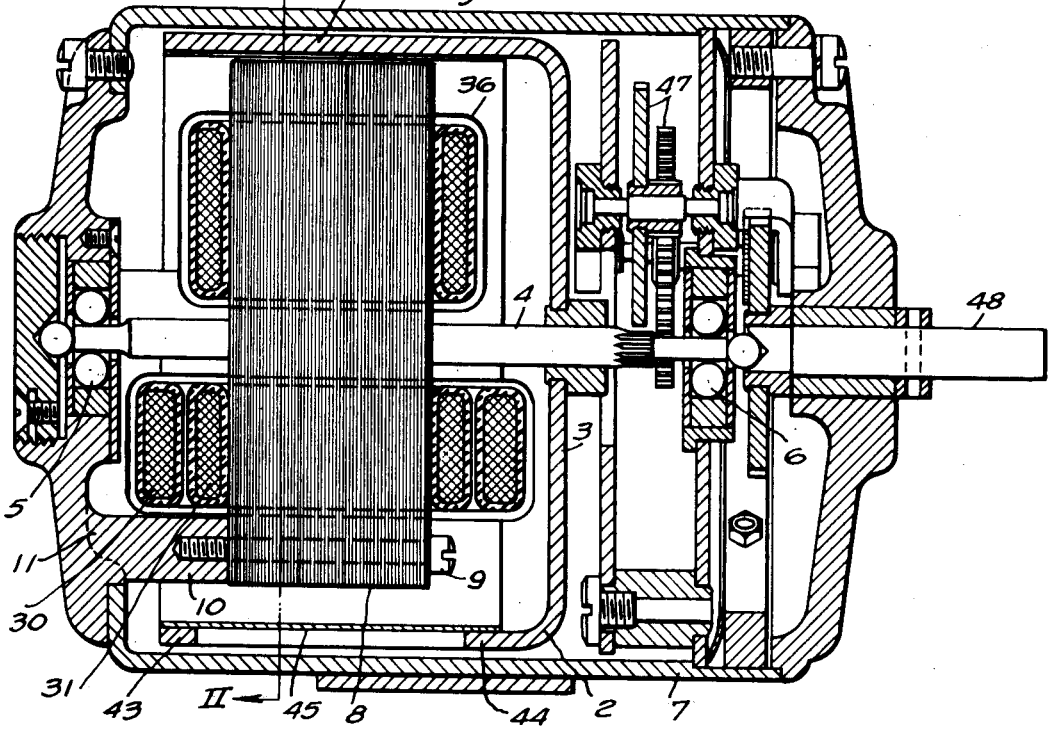
Figure 1 is a longitudinal vertical section through a motor embodying the principles of my invention in a preferred form.

My motor comprises, in general, a rotor member and a stator member. In the preferred form of apparatus shown in Figs. 1 and 2, the rotor 2 is of cup shape and is secured, at its closed end 3, upon a shaft 4. The shaft is journalled in suitable bearings 5 and 6 supported by a suitable frame or casing 7. The stator consists of a bundle of iron laminations or punchings 8 which are provided with windings, as hereinafter described. The stator is provided with a central perforation extending therethrough at right angles to the shaft 4 for loosely receiving said shaft to permit the free rotation thereof. The stator is secured adjacent to the open end of the cup-shaped rotor by screws 9 cooperating with lugs 10, on the adjacent end plate 11 of the supporting frame 7. The disposition of parts just described results in a most compact construction, economizing to the utmost in the amount of material utilized and thus reducing also the losses and the power consumption.

Figure 2:
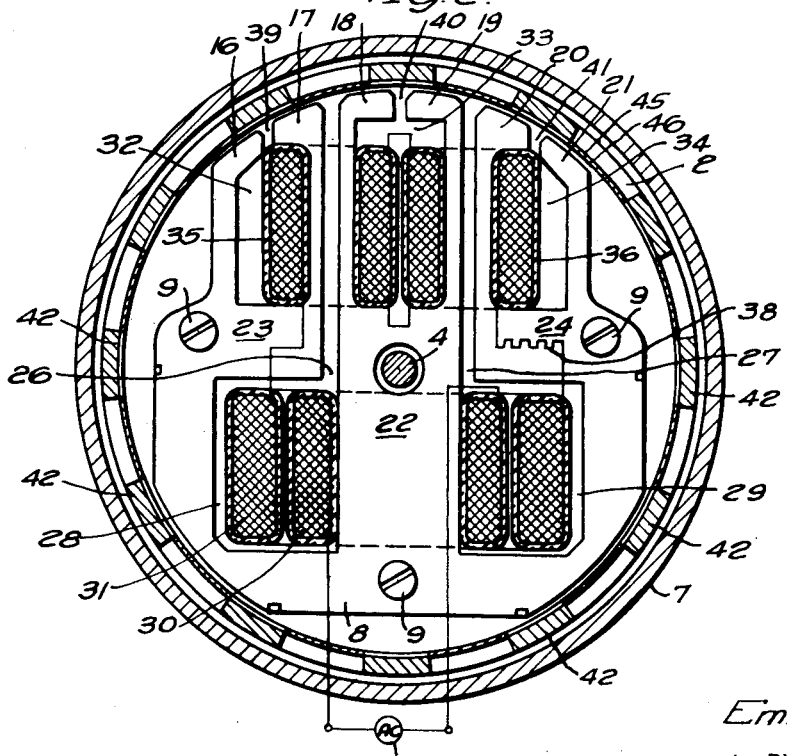
Fig. 2 is a transverse section, taken on the line II—II of Fig. 1.

The stator punchings, as shown in Fig. 2, are cut to provide six salient poles 16 to 21, all disposed in the upper portion of the stator. The central pair of poles 18 and 19 are disposed at the upper end of a long, vertically extending, central core 22 which extends to within a very short distance of the bottom end of the laminations. The two end pairs of pole pieces 16 and 17 and 20 and 21 are disposed on vertically extending core portions, designated by the numerals 23 and 24, respectively, both of said core portions being separated from the central core portion by means of slots 26 and 27. The bottoms of the three core portions 22, 23 and 24 are joined around two openings 28 and 29 for receiving a primary coil 30 and a secondary coil 31 surrounding the vertically extending core portion 22.

The three pairs of salient pole pieces define spaces 32, 33 and 34, respectively, disposed adjacent to the pole faces, or periphery of the stator member, for receiving coils 35 and 36. The central space 33, which is provided between the two central pole pieces 18 and 19, receives one side of each of the two coils 35 and 36, the other sides of the coils being disposed, respectively, in the spaces 32 and 34.

The primary coil 30 is energized from a commercial 110-volt alternating-current line, as indicated in Fig. 2, and the secondary coil 31 is connected to the two coils 35 and 36 by means of circuits including a resistor 38.

In the construction described, the flux which traverses the central vertically-extending core portion of the two centrally located pairs of pole pieces 18 and 19, lags substantially 90° behind the primary electromotive force, whereas, the current in the secondary circuit, on account of the resistor 24, and hence, the flux produced by the two coils 35 and 36 is in phase with the secondary voltage and hence, substantially 90° out of phase with the primary flux. The resistance of the resistor 24 is high, as compared with the reactance of coils 35 and 36. It is noted that the primary flux passes through the two central pole pieces 18 and 19 in parallel, and the secondary flux from the coil 36 passes through the two pole pieces 19 and 20 in parallel.

While I have described a self contained phase-splitting unit, which is the preferred construction, it will be obvious that the phase-splitting devices may be disposed externally of the stator member.

In assembling the stator parts, the primary and secondary coils 30 and 31 are preferably preformed and the central vertically-extending core portions 23 of the laminations 8 are then threaded, one at a time, through the center of the coils, the side core portions 23 and 24 of each lamination being temporarily bent aside for the purpose of clearing the primary and secondary coils, each lamination being suitably flattened after it is in proper position. The primary and secondary coils are thus disposed at a point remote from the pole faces and are preferably disposed below the shaft 4.

The two exciting coils 35 and 36 of the secondary circuit are then wound by hand, the wires being passed into the spaces 32, 33 and 34, through the small gaps 39, 40 and 41 between the pole pieces.

The rotor 2 preferably comprises an iron cup which is notched in its cylindrical portion, to provide a cylindrical cage consisting of longitudinally extending bars 42 joined at their ends by two integral annular portions 43 and 44, the annular portions lying outside of the field of the stator member. The longitudinally extending bars of the rotor cage thus provide salient rotor pole pieces which are joined together by the annular magnetizable yoke members 43 and 44 (Fig. 1) for providing return paths for the flux.

Disposed within the iron cage is a cylinder 45 of thin sheet metal, preferably aluminum or copper, in the air gap 46 separating the rotor member from the stator member. The spacing of the rotor pole pieces 42 is such that, in one position of the rotor, as shown in Fig. 2, three polar members are substantially opposite the center lines of the three pairs of stator pole pieces. Preferably, as shown in Fig. 2, the three polar members just mentioned are consecutive rotor pole pieces.

It will be observed, from the foregoing description, that the primary flux which leaves the stator member from the two central pole pieces 18 and 19, crosses the air gap 46 into the magnetic portions of the rotor member and then re-crosses the air gap 46 into the four adjacent pole pieces 16 and 17 and 20 and 21 of the stator member. The secondary flux, which leaves the stator pole pieces 17 and 18, crosses the air gap 46 to the magnetizable portions of the rotor member and then re-crosses the gap to the adjacent stator pole pieces 16 and 19. Likewise, the secondary flux which leaves the stator pole pieces 19 and 20, crosses the gap into the magnetizable portion of the rotor member and then re-crosses the gap to return to the adjacent stator pole pieces 18 and 21. The two secondary fluxes are of opposite polarities. It will thus be seen that the secondary fluxes are in quadrature with the primary flux, both in time and in space phase relation, so that a substantially balanced two-phase flux is produced, which rotates slowly or at a multiple pole-number speed, around that portion of the stator member which is provided with pole pieces. It is noted that no flux enters or leaves the air gap except in the top portion of the stator member.

The aluminum cylinder 45 of the rotor operates as an induction-motor secondary member to produce a starting torque and a part, at least, of the running torque, under some conditions, by reason of the eddy-currents induced therein by the alternating fluxes traversing the same from the stator pole pieces. The salient polar members 42 of the rotor lock into synchronism with the rotating flux hereinabove described, to cause the motor to operate at a synchronous speed, as a synchronous motor. The synchronous speed depends upon the number of rotor polar members 42, which, by the way, need not be an even number because the stator flux does not extend all of the way around the periphery of the stator member.

By the construction hereinabove described, I have been able to produce a synchronous clock or meter motor which produces about 100 times as much torque as motors now available on the market for the same purpose, and consumes only about twice as much power as motors of present design.

As shown in Fig. 1, I preferably provide a set of reducing gears 47 for driving a low-speed shaft 48 which extends from the frame 7 and provides means for transmitting the movement of the motor to any desired recording, metering, or control device (not shown).

Various modifications may be made in my invention without departing from the spirit and scope thereof, and I desire, therefore, that only such limitations shall be placed thereon as are imposed by the prior art and are set forth in the appended claims.

I claim as my invention:

1. An electric motor characterized by a stator member having a magnetizable core provided with at least three adjacent pairs of pole pieces, each of said pairs of pole pieces constituting a separate magnetic path and having an air space between it and the next adjacent pair of pole pieces, each of said pairs of pole pieces being provided with a coil-side receiving space between the same at a point close to the faces of the pole pieces and constituting a continuous magnetic path back of said space, said core having also a space for a magnetizing coil remote from said pole faces, a single-phase magnetizing coil located in said remote space and embracing the common or continuous magnetic path of the central pair of pole pieces and applying an alternating magnetomotive force to said central pole pieces in parallel, a pair of single-phase coils located in said spaces close to the pole faces, the space provided between the central pair of pole pieces receiving one coil side of each of said pair of coils, means for causing the magnetizing current in the first-mentioned, or remotely disposed, coil to be substantially quadrature-related to the magnetizing currents in the pair of coils, and a rotor member separated from said stator member by an air gap and comprising magnetizable material capable of completing the flux path, whereby the fluxes produced by each of the three magnetizing coils may leave the two adjacent pole pieces embraced by that coil, cross the air gap to the magnetizable material of the rotor member and re-cross the air gap to the next adjacent pole piece on either side of said two pole pieces.

2. A motor, as defined in claim 1, further characterized by a rotor member having definite polar members opposite the stator pole pieces and a connecting magnetizable yoke at another point, the relative spacings being such that, at one position of the rotor member, three rotor polar members are substantially opposite the center lines of the three pairs of stator pole pieces.

3. A motor, as defined in claim 1, further characterized by a rotor member having salient-pole means for causing it to lock into step at a synchronous speed, and induction-motor means for producing a starting torque and a part, at least, of the running torque.

4. A motor, as defined in claim 1, further characterized by a rotor member having a continuous thin sheet-metal member next to the air gap and a discontinuous magnetizable portion back of said continuous member and providing salient rotor poles jointed together by a continuous magnetizable yoke at a point remote from the air gap.

5. An electric motor characterized by a stator member having a laminated core comprising punchings having salient pole pieces and spaces for exciting coils, a single-phase primary coil located at a point remote from the pole pieces and applying an alternating magnetomotive force to two adjacent pole pieces in parallel, a primary coil, a secondary coil having more turns than said primary coil and disposed co-axially therewith, a pair of single-phase exciting coils located at points close to the pole pieces and applying alternating magnetomotive forces, respectively, to different pairs of adjacent pole pieces, each of said pairs comprising one of the pole pieces excited by the circuit connections including a series resistor for connecting said pair of exciting coils to said secondary coil, a centrally located perforation extending through said core member at right angles to the laminations, a shaft rotatably disposed in said perforation, and a rotor member of cup-shape surrounding said stator core member and fixed to the shaft at its closed end, said stator core member being supported only at the side adjacent to the open end of the cup member.

6. A motor, as defined in claim 5, characterized by the primary and secondary coils being disposed mainly on one side of the shaft, and the salient pole pieces of the stator core being disposed only on the other side of the shaft and extending less than half-way around the periphery.

7. A motor, as defined in claim 5, characterized by the rotor member of cup-shape having a continuous sheet-metal cylinder and a cylindrical iron cage member surrounding said cylinder, said cage member comprising longitudinally extending bars joined at their ends by an integral annular iron portion, said annular iron portion lying outside of the field of the stator member.

In testimony whereof, I have hereunto subscribed my name this 15th day of October, 1929.

EMIL H. GREIBACH.